United States Patent
Gernaert

(10) Patent No.: US 12,547,204 B2
(45) Date of Patent: Feb. 10, 2026

(54) CONTROL DEVICE FOR CONTROLLING REAL OR VIRTUAL AIRBORNE OBJECTS

(71) Applicant: Manuel-René Gernaert, Hamburg (DE)

(72) Inventor: Manuel-René Gernaert, Hamburg (DE)

( * ) Notice: Subject to any disclaimer, the term of this patent is extended or adjusted under 35 U.S.C. 154(b) by 709 days.

(21) Appl. No.: 17/419,922

(22) PCT Filed: Jan. 3, 2020

(86) PCT No.: PCT/EP2020/050107
§ 371 (c)(1),
(2) Date: Jun. 30, 2021

(87) PCT Pub. No.: WO2020/141227
PCT Pub. Date: Jul. 9, 2020

(65) Prior Publication Data
US 2022/0083091 A1     Mar. 17, 2022

(30) Foreign Application Priority Data

Jan. 3, 2019   (DE) .......................... 102019100056.4

(51) Int. Cl.
*G05G 9/047*       (2006.01)
*G05D 1/00*        (2024.01)

(52) U.S. Cl.
CPC ....... *G05G 9/04737* (2013.01); *G05D 1/0016* (2013.01); *G05D 1/0808* (2013.01);
(Continued)

(58) Field of Classification Search
CPC ............ B64C 13/0421; B64U 2201/20; G05D 1/0016; G05D 1/0808; G05G 2009/04766;
(Continued)

(56) References Cited

U.S. PATENT DOCUMENTS 5,503,040 A * 4/1996 Wright ............... G05G 9/04737
                                                    345/157
6,932,113 B1 * 8/2005 Kauss ................... E02F 9/2004
                                                    137/636.2
(Continued)

FOREIGN PATENT DOCUMENTS

DE        402009005121        10/2009

OTHER PUBLICATIONS

Mentour Pilot, "Aircraft YOKE (Steering wheel), how does it work?", Apr. 13, 2018, YouTube, https://www.youtube.com/watch?v=U8gGUJN17m4 (Year: 2018).*

(Continued)

*Primary Examiner* — Minnah L Seoh
*Assistant Examiner* — Gregory T Prather
(74) *Attorney, Agent, or Firm* — Grogan, Tuccillo & Vanderleeden LLP

(57) ABSTRACT

In order to further improve a control device for controlling unmanned and/or manned and/or virtual airborne objects in such a way that the control is easier to use and can be learned intuitively and more quickly even by untrained individuals, the control device has a first control element for controlling a movement about a vertical axis, a longitudinal axis and a transverse axis of the airborne object, a rotary movement and/or pivoting movement of the first control element about its vertical axis, its longitudinal axis and its transverse axis causing the airborne object to move about its vertical axis, longitudinal axis and transverse axis, and the control device also has a second control element for changing the flying altitude and/or a speed and/or a thrust of the airborne object.

7 Claims, 9 Drawing Sheets

(52) U.S. Cl.
CPC .............. *B64U 2201/20* (2023.01); *G05G 2009/04766* (2013.01); *G05G 2009/04781* (2013.01)

(58) Field of Classification Search
CPC .......... G05G 2009/04774; G05G 2009/04781; G05G 9/047; G05G 9/04737
See application file for complete search history.

(56) References Cited

U.S. PATENT DOCUMENTS

| | | | |
|---|---|---|---|
| 2016/0297522 A1 | 10/2016 | Brulez et al. | |
| 2017/0108857 A1 | 4/2017 | Line | |
| 2018/0356907 A1* | 12/2018 | Parazynski | G06F 3/014 |
| 2021/0311565 A1* | 10/2021 | Stack | G01L 5/16 |

OTHER PUBLICATIONS

International Search Report from corresponding PCT Application No. PCT/EP2020/067953 dated Oct. 6, 2020.

* cited by examiner

CONTROL DEVICE FOR CONTROLLING REAL OR VIRTUAL AIRBORNE OBJECTS

CROSS REFERENCE TO RELATED APPLICATIONS

The present application is a national stage of International Application No. PCT/EP2020/050107, filed on Jan. 3, 2020, which claims priority to German Patent Application No. 102019100056.4 filed on Jan. 3, 2019, all of which are hereby incorporated by reference in their entireties.

DESCRIPTION

The invention relates to a control device for controlling unmanned and/or manned and/or virtual airborne objects, in particular real and/or virtual multicopters, wherein a movement about a vertical axis, a longitudinal axis and a transverse axis of the airborne object is controlled by means of a first control element. Furthermore, a change in an altitude and/or a speed and/or a thrust of the airborne object is controlled by means of a second control element.

To control unmanned airborne objects such as drones or multicopters, traditional remote controls are used, which generally have two levers arranged next to one another and at a distance from one another. These levers can be used to control the movement of the drone relative to its three axes as well as the change in the flight altitude. This is usually a traditional four-channel remote control, wherein three channels are used to control the movement of the airborne object about its vertical axis, transverse axis and longitudinal axis, and wherein a fourth channel is used6310 to vary the upward and downward movement. In such a traditional remote control, all four channels are controlled via the two control levers (two channels each by means of one control lever).

PRIOR ART

The design DE 402009005121 shows a traditional remote control with two separate control levers. Each of the two control levers controls two axes.

US 2016/0297522 A1 describes a traditional four-channel remote control with two levers for controlling a drone, with the remote control also having a screen for displaying images or videos recorded by a camera on the drone.

Another remote control for controlling drones is described in US 2017/0108857 A1. This remote control has a touch-sensitive display, via which the drone or its movement about the respective axes can be controlled. Furthermore, the movement of the remote control itself about its axes makes it possible to control the movement of the drone about the corresponding axis.

PRESENTATION OF THE INVENTION: OBJECT, SOLUTION, ADVANTAGES

The invention is based on the object of further improving a control device for controlling unmanned and/or manned and/or virtual airborne objects in such a way that the control is easier to use and can be learned intuitively and more quickly even by untrained individuals.

For this purpose, according to the invention, a control device for controlling unmanned and/or manned and/or virtual airborne objects is provided, wherein a movement about a vertical axis, a longitudinal axis and a transverse axis of the airborne object is controlled by means of a first control element, wherein furthermore a change in a flight altitude and/or a speed and/or a thrust of the airborne object is controlled by means of a second control element. According to the invention, the control device is designed in such a way that a rotary movement and/or pivoting movement of the first control element about its vertical axis, its longitudinal axis and its transverse axis causes the airborne object to move about its vertical axis, longitudinal axis and transverse axis.

The control device according to the invention can be used, for example, for controlling underwater drones, unmanned and manned drones, spaceships, guided missiles, helicopters, remote heads (e.g., remote camera heads), model airplanes or gimbals. Furthermore, the control device according to the invention can be used to control virtual airborne objects, for example, for video or computer games or flight simulators.

In order to make the operation of the control device according to the invention easier to learn and more intuitive to use, the control device has two separate control elements, a first control element and a second control element. In contrast to the traditional four-channel remote control, the first control element is used to control three channels, namely to control the movement or the deflection about the vertical axis, the longitudinal axis and the transverse axis of the airborne object. The second control element is used to control the fourth channel, namely to change an altitude and/or a speed and/or a thrust of the airborne object. In the case of a drone or a multicopter, for example, this corresponds to the throttle. In the case of other airborne objects, the control of the fourth channel via the second control element could, for example, bring about a change in the speed, the acceleration or the thrust, in particular the forward thrust.

To control the three channels, the first control element is rotatably and pivotably mounted in such a way that a rotary movement about the vertical axis of the first control element causes the airborne object to be controlled and moved about its vertical axis. A pivoting movement or rotational movement of the first control element about its longitudinal axis causes the airborne object to move about its longitudinal axis. Furthermore, a rotary movement or pivoting movement of the first control element about its transverse axis causes the airborne object to move about its transverse axis. The first control element can thus be moved or rotated about its three axes, with each movement or deflection causing a corresponding movement or deflection of the airborne object about the respective corresponding axis.

For this purpose, the control device has a stationary base, relative to which the first control element can be moved or pivoted or rotated about its three axes. This is to be understood to mean that the first control element is rotatably and/or pivotably mounted on the stationary base. The stationary base is therefore not moved together with the first control element. The stationary base could, for example, be designed as a support plate or a correspondingly designed frame, a tripod or otherwise. The stationary base could also be built into an object. By means of a corresponding weight or pressure ratio, the base can be held stationary when the first control element is actuated or moved. The stationary base can thus also be used to support the control device on a base, for example, a table. Alternatively, the control device could also be designed to be worn around the neck. In this case, the stationary base could be a support element which is to be supported on the body or positioning in front of the body. In the context of the invention, the stationary base is therefore to be understood as an element which is stationary relative to the first control element. The stationary base does not have to be but could be permanently fixed in place.

The first control element is preferably connected to the stationary base via a bearing element or via a plurality of bearing elements. In particular, the first control element is rotatably mounted on the stationary base or rotatably connected to the same by means of a bearing element such that it is rotatable about the vertical axis of the first control element. Thus, the first control element or its vertical axis is at least temporarily held or fixed in place via the stationary base. The control device as a whole can, however, still be designed to be portable.

For each of the three axes of the control element, the control device has angle pickups for detecting the deflection of the movement about the respective axis. These angle pickups can be arranged on the respective axis at any suitable point. For example, the angle pickups can be attached in the middle of the axes, at the ends of the axes or between the axes. The deflection of the control element about the respective axis is recorded by means of the angle pickup. The angle detected by means of the angle pickup serves as the basis for controlling the deflection or the movement of the airborne object about the respective or corresponding axis.

The longitudinal axis and the transverse axis of the first control element can be spaced apart from one another or have an intersection point and thus be arranged on one plane. The distance between the longitudinal axis and the transverse axis is preferably less than 10 cm, particularly preferably less than 5 cm and very preferably less than 2.5 cm. In particular, however, the vertical axis, the longitudinal axis and the transverse axis of the first control element run through a common point, a central point of intersection of the three axes. In particular, the common point lies above the stationary base.

Furthermore, it is preferably provided that the first control element is rendered stationary in relation to its vertical axis and/or its longitudinal axis and/or its transverse axis by means of a spring element. This provides for an automatic return to the zero position or zero setting of the first control element in relation to its respective axis. The spring element is a flexible element, in particular a spring, a rubber or a hydraulic element, and locks the respective axis in place by means of a tension and/or pressure connection. The spring action or spring force of the spring element can preferably be set or varied individually for each axis or jointly for all axes. A separate spring element can also be provided for each axis. The spring action or spring force can also be deactivated if necessary. Thus, the first control element is, in relation to its vertical axis and/or its longitudinal axis and/or its transverse axis, fixed in the neutral state or its zero setting by means of the spring element.

It is also preferably provided that the first control element has two parallel and spaced-apart planes which are rotated or pivoted together about the respective axis, the vertical axis, the longitudinal axis and the transverse axis of the first control element. The two planes can be plate shaped. Both planes are connected to one another in such a way that they follow the same movement. This means that the position of the two planes, with respect to one another and their distance from one another, remain constant during a movement of the first control element. Furthermore, it is preferably provided that the central point of intersection of the three axes of the control element is arranged between the two planes, very particularly preferably centrally between the two planes.

The first control element could also have two planes arranged at an angle to one another. For example, the two planes could be arranged at an angle between 5 degrees and 30 degrees to one another. For certain applications, ease of use is increased if the two planes are arranged at an angle greater than 0 degrees to one another. This way, for example, a slight inclination of one of the two planes towards the user can be achieved. Most preferably, the angle between the two planes of the first control element can be set between 0 degrees (parallel to one another) and 30 degrees. The user can therefore very particularly preferably specify the angle himself, depending on the application or the desired setting.

Alternatively, the first control element is mounted directly on the stationary base so that it can be moved about all three axes. For this purpose, the first control element can, for example, have a cross section that increases starting from the stationary base. For example, the first control element is, at least partially, formed conically or has, at least partially, the shape of a conical section.

The second control element is preferably designed as a lever, rotary knob, rocker, pistol trigger or pedal. Depending on whether the second control element is provided in such a way that it can be operated with a foot or with one finger or several fingers, the second control element can be designed accordingly. For the foot actuation, the second control element is accordingly designed, in particular, as a pedal, pedal-shaped or as a rocker. For the manual operation or for an operation with one or more fingers, the second control element is preferably designed as a lever, rotary knob, rocker or pistol trigger.

The second control element is preferably arranged on the first control element and/or on the stationary base of the control device.

Thus, preferably at least two variants for the arrangement of the second control element are provided. In a first variant, the second control element is attached to the first control element, wherein the second control element is moved along with the first control element so that, when the first control element is operated with both hands, the second control element can always be reached or operated with the finger. It is, therefore, not necessary to release the first control element in order to operate the second control element.

In the second variant, the second control element is not connected to the first control element but to the stationary base of the control device. The second control element does not follow the movement of the first control element.

For the first variant, the second control element could be arranged on the first control element, in particular on the upper plane of the first control element, as a lever, rotary wheel, rocker or pistol trigger. In the second variant, the second control element could be provided separately as a pedal or as a rocker for a foot actuation, for example, and thus not be connected to the first control element.

It is also preferably provided that the control device has two handles which are rigidly connected to the first control element or to the stationary base of the control device. The two handles are to be gripped with both hands. The alignment of the handles as well as the distance between the handles is preferably adjustable or changeable. The handles can be designed as completely separate handles or can also be continuously connected to one another, for example, by means of a bar. Furthermore, the handles can be part of the upper plane of the first control element or form one piece with the first control element.

In a first variant, the handles are rigidly connected to the first control element. This variant is used, in particular, for a seated use or seated operation of the control device. The first control element is moved directly via the handles. The handles are particularly preferably arranged on the upper plane of the first control element. This variant is also suitable when the control device is worn around the neck and operated in front of the body while standing.

In a second variant, the handles are rigidly connected to the stationary base of the control device and not to the first control element. This variant is used, in particular, for a sitting, lying or standing operation of the control device. In these operating modes, the first control element can have a sitting surface, lying surface or standing surface on which the person can sit, lie down or stand and move the first control element abound its three axes by shifting his weight. For these types of operations, the handles are preferably arranged rigidly with the stationary base and not on the first control element. The handles thus have more of a holding or supporting function, wherein the first control element is moved by means of body movements or weight shifts and not directly via the handles.

The handles are preferably arranged on a line parallel to the transverse axis of the first control element and particularly preferably offset in height relative to the transverse axis of the first control element. The handles can but do not need to be arranged in the middle of the first control element.

Furthermore, a zero setting or zero position of the first control element can be set and varied in relation to its vertical axis, its longitudinal axis and its transverse axis. A zero setting of the first control element is to be understood as the setting or the position which does not cause the airborne object to be deflected. It is therefore a neutral setting of the first control element. The zero setting can but does not have to correspond to the center of a maximum deflection or a maximum angle about one of the axes. The zero setting could be provided in such a way that the first control element is arranged horizontally and parallel to the stationary base in the zero setting. Alternatively, the zero setting could also represent an inclined position or a predetermined deflection about one or more of the axes.

Furthermore, it is preferably provided that the first control element can be rotated or pivoted about its vertical axis by a first maximum angle, wherein the first maximum angle is adjustable and variable. In the context of the present invention, a maximum angle is to be understood as a maximum overall deflection or a maximum range by which the control element can be rotated or pivoted about the respective axis. The first maximum angle relates to the maximum deflection about the vertical axis of the first control element. The first maximum angle can be set symmetrically or asymmetrically about the zero setting in relation to the vertical axis of the first control element. For example, by varying or changing the zero setting of the first control element in relation to its vertical axis, an asymmetrical placement can be achieved. A preferred starting value for the first maximum angle corresponds to 50°; with a symmetrical placement, a maximum deflection of the first control element about its vertical axis by 25° in each of the two directions is possible on this basis.

A translation factor is used to determine the relationship between a recorded angle and the actual deflection or the actual angle about the axis of the airborne object. The deflection of the first control element about a respective axis is detected by means of an angle pickup as described above. The translation factor is particularly preferably adjustable. The translation factor can be set by varying the maximum total deflection or the corresponding maximum angle and/or also in some other way, for example electronically in the form of a calculated value.

A separate translation factor can be provided for each axis. In the context of the present invention, the first translation factor relates to the ratio between the detected angle around the deflection of the first control element about its vertical axis and the actual deflection about the vertical axis of the airborne object. The second translation factor relates to the ratio of the deflections about the longitudinal axis of the first control element and the actual deflection of the airborne object about its longitudinal axis. The third translation factor relates to the ratio of the deflections about the transverse axis of the first control element and the actual deflection of the airborne object about its transverse axis. The following simple equation is used to illustrate this principle:

Angle $A/X$(translation factor)=angle $B$

Angle A corresponds to the detected angle deflection of the first control element about a respective axis;

X corresponds to the translation factor for the corresponding axis;

angle B corresponds to the actual control of the angle deflection for the airborne object about the corresponding axis.

The first control element is also preferably rotatable about its longitudinal axis by a second maximum angle, wherein the second maximum angle is adjustable and variable. Furthermore, the first control element is preferably rotatable about its transverse axis by a third maximum angle, wherein the third maximum angle is adjustable and variable. The same previously described features relating to the first maximum angle apply to the second and third maximum angles.

Thus, the first maximum angle relates to the maximum total deflection of the first control element about its vertical axis, the second maximum angle relates to the maximum total deflection of the first control element about its longitudinal axis and the third maximum angle relates to the maximum total deflection of the first control element about its transverse axis.

Furthermore, it is preferably provided that a zero setting of the second control element can be set and varied. A maximum overall deflection or a maximum range can thus also be varied and set for the second control element. The zero setting can be in a zero position, a central position or in any region between the zero position and the central position of the second control element. This position or this zero setting can particularly preferably be changed.

As for the first control element, a translation factor, namely the fourth translation factor, can be provided for the second control element. The fourth translation factor then reflects the ratio between the detected deflection of the second control element and the actual control of the airborne object. In the case of a multicopter, this would be the ratio between the detected deflection of the second control element and the throttle with which the height of the multicopter is changed. The following simple equation is used to illustrate this principle:

Deflection $A/X$(translation factor)=control $B$

Deflection A corresponds to the detected deflection of the second control element;

X corresponds to the translation factor for the second control element;

control B corresponds to the actual control of the airborne object to change its altitude, speed or thrust;

The second control element preferably has a spring means with which it is reset to its zero setting after the second control element is actuated. After the second control element has been released, it is thus automatically reset by means of the spring means. As with the spring element of the first control element, the spring means of the second control element is preferably adjustable and variable with regard to its spring action or spring force. An automatic return to the zero setting of the second control element is thus provided.

BRIEF DESCRIPTION OF THE DRAWINGS

The invention is explained below by way of example on the basis of preferred embodiments.

The schematic figures show the following.

PREFERRED EMBODIMENTS OF THE INVENTION

Figure 1:
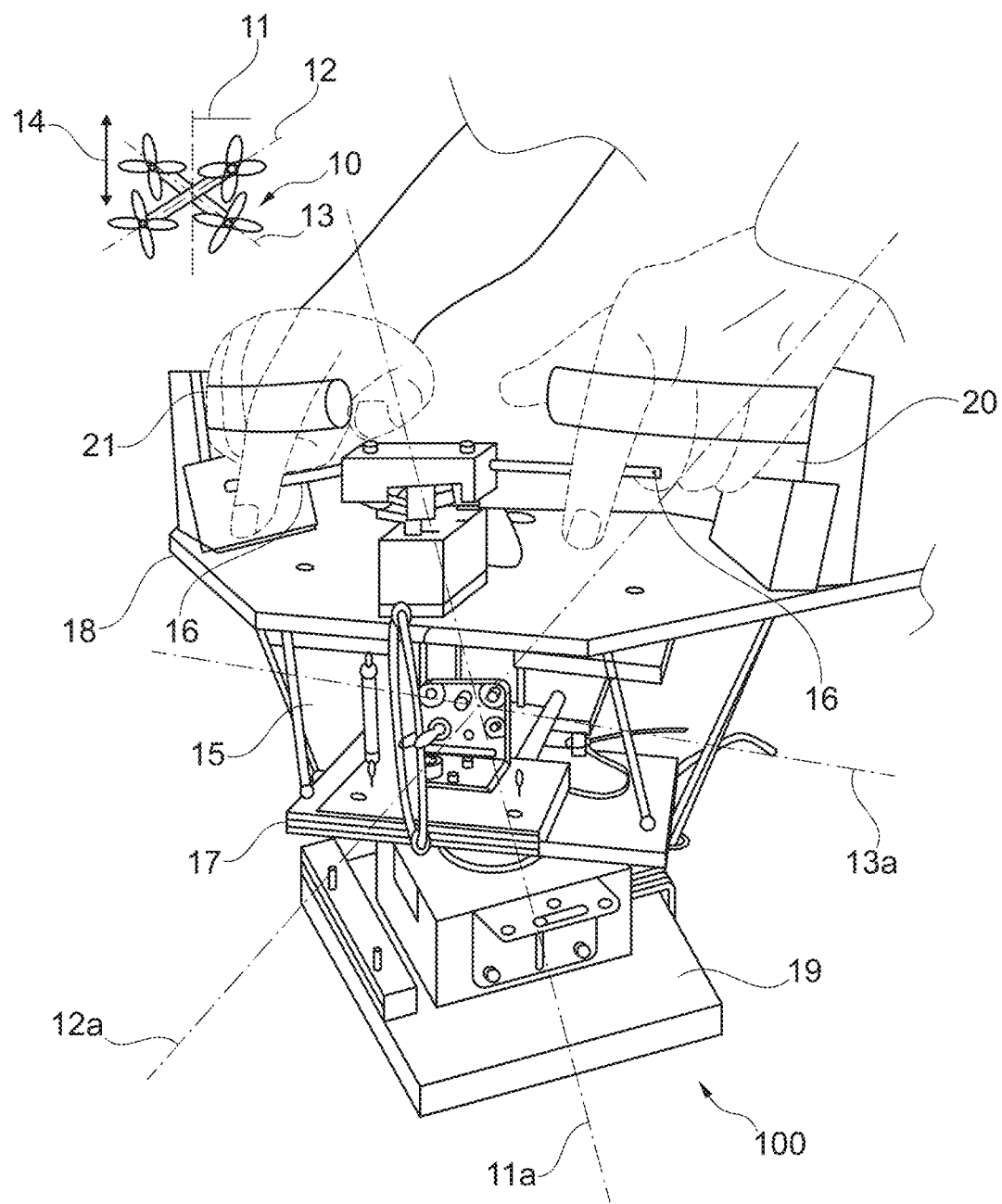
FIG. 1 is a perspective view of a control device.
Figure 1A:
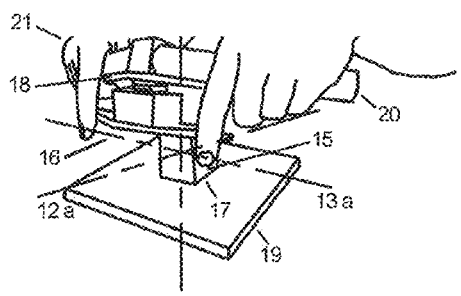
Figure 1A:
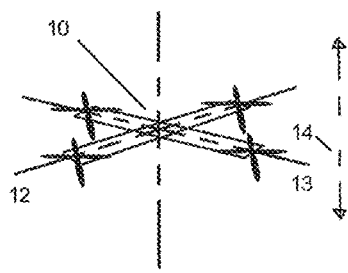
Figure 1B:
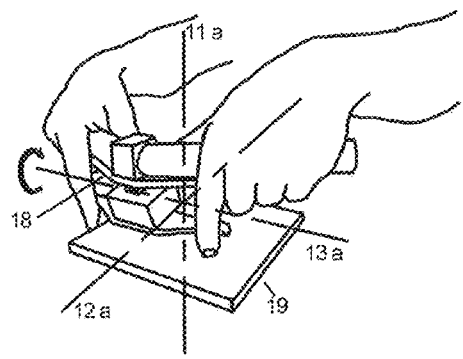
Figure 1B:
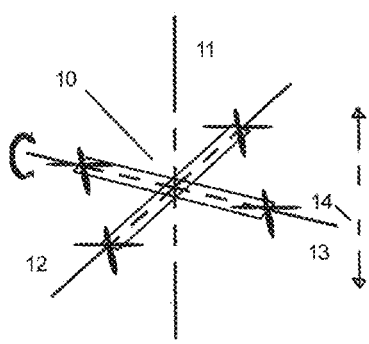
Figure 1C:
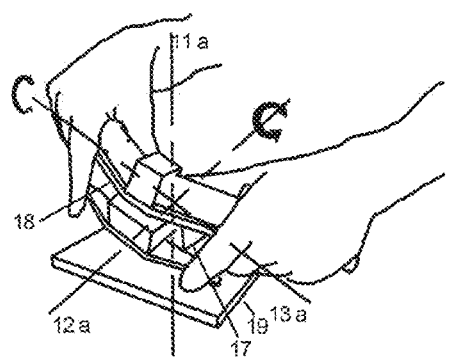
Figure 1C:
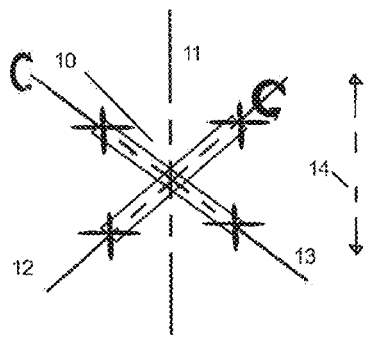
Figure 1D:
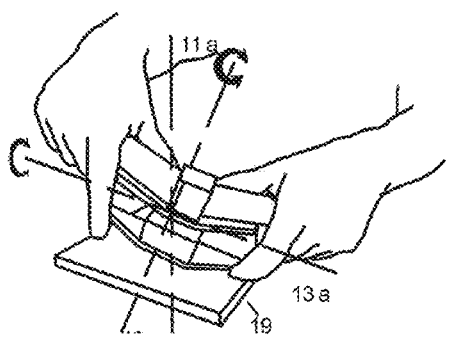
Figure 1D:
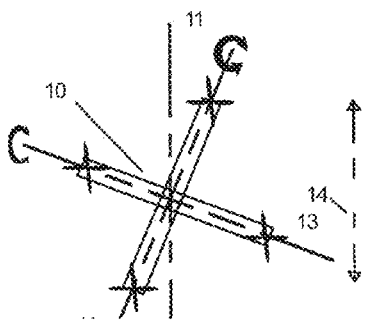

FIG. 1 shows, by way of example, a variant of a control device 100 for controlling unmanned and/or manned and/or virtual airborne objects 10. The control of a multicopter or a drone is shown here as an example. The movement about a vertical axis 11, a longitudinal axis 12 and a transverse axis 13 of the airborne object 10 is controlled via the control device 100. The movement about these three axes 11, 12, 13 of the airborne object 10 is controlled by means of the first control element 15 of the control device 100.

For this purpose, the first control element 15 is mounted on a stationary base 19 in such a way that it is rotatable about the vertical axis 11a of the first control element 15 and also pivotable about the longitudinal axis 12a and the transverse axis 13a of the first control element 15. The first control element has two planes 17, 18 that are parallel to one another.

A rotational movement of the first control element 15 about its vertical axis 11a effects, taking into account the first translation factor, a corresponding rotational movement of the airborne object 10 about its vertical axis 11. A pivoting movement of the first control element 15 about its longitudinal axis 12a effects, taking to account the second translation factor, a corresponding pivoting movement of the airborne object 10 about its longitudinal axis 12. A pivoting movement of the first control element 15 about its transverse axis 13a effects, taking into account the third translation factor, a pivoting movement of the airborne object 10 about its transverse axis 13.

As already mentioned, the control of a multicopter or a drone is shown in FIG. 1 by way of example. In the case of a multicopter, the fourth channel corresponds to the throttle and thus to the change in altitude 14 of the airborne object 10. This change in the flight altitude 14 is controlled via the second control element 16 of the control device 100. In the example shown in FIG. 1, the second control element 16 is arranged on the first control element 15 in such a way that it can be operated in a simple manner by using the index finger without having to let go of the handles 20, 21 of the control device 100 on the first control element 15.

In the example shown in FIG. 1, the handles 20, 21 are arranged on the first control element 15 and are connected to the same. The alignment of the handles 20, 21, in particular their inclination to the surface of the first control element 15, can be varied or adjusted. The distance between the handles 20, 21 could also be adjustable.

FIGS. 7a to 7d show exemplary rotating and pivoting movements of the first control element 15 of the control device 100 as well as the respective corresponding movements of the airborne object 10.

Figure 2:
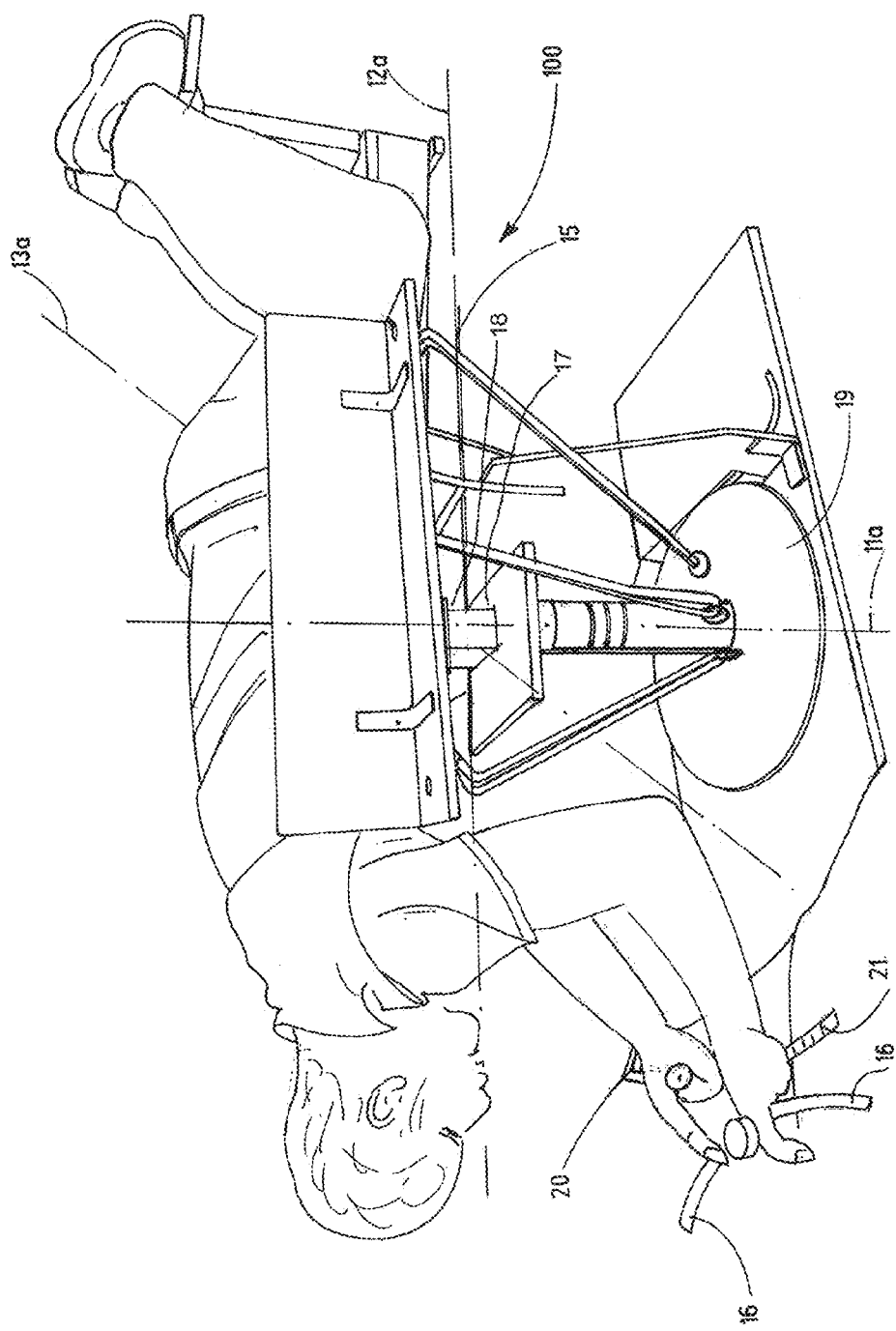
FIG. 2 is a perspective view of a control device for the application or operation in the lying state.

FIG. 2 shows an example of control device 100 for a surface-mounted operation. For this purpose, the first control element 15 has a lying surface on which the operator can lie down. In contrast to the variant shown in FIG. 1, the handles 20, 21 and also the second control element 16 are not arranged on the first control element 15 or are connected to the same. In contrast, the handles 20, 21 in this variant can be connected to the stationary base 19 or be fixed separately.

In the example shown in FIG. 2, in contrast to the variant shown in FIG. 1, the first control element 15 is moved by shifting the body weight. For this purpose, the handles 20, 21 are used for support purposes. Thus, by shifting the body weight, the first control element 15 can easily be rotated about its vertical axis 11a and tilted or pivoted about its longitudinal axis 12a and about its transverse axis 13a.

FIG. 2 shows only one possibility for a control device, wherein the first control element 15 can be operated by shifting the weight of the body. Instead of a lying surface, the control device 100 could also have a sitting surface for a seated operation or a standing surface for a standing operation.

Figure 3:
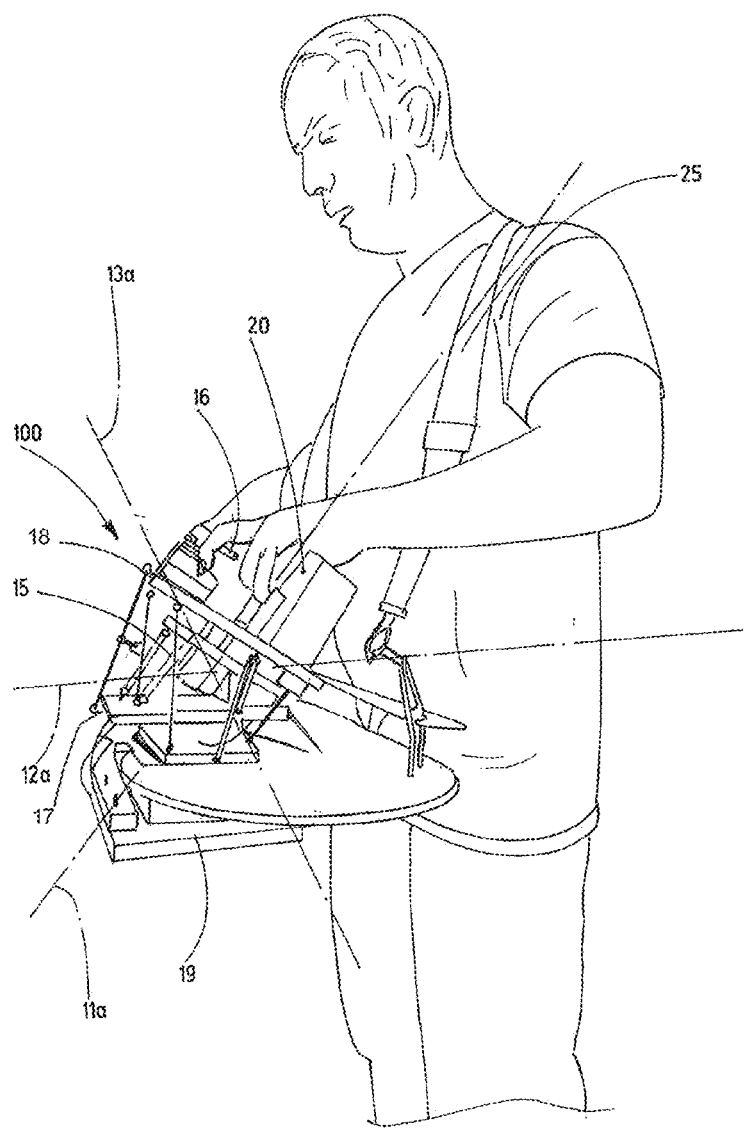
FIG. 3 is a perspective view of a control device to be hung around a person's neck.

FIG. 3 shows an example of control device 100 that is to be hung around a person's neck. The control device 100 has a strap 25 for this purpose. In principle, the example shown in FIG. 3 is designed similarly to the variant shown in FIG. 1. In contrast to the variant shown in FIG. 1, however, the stationary base 19 has a support element for supporting the device on or in front of the body.

Figure 4:
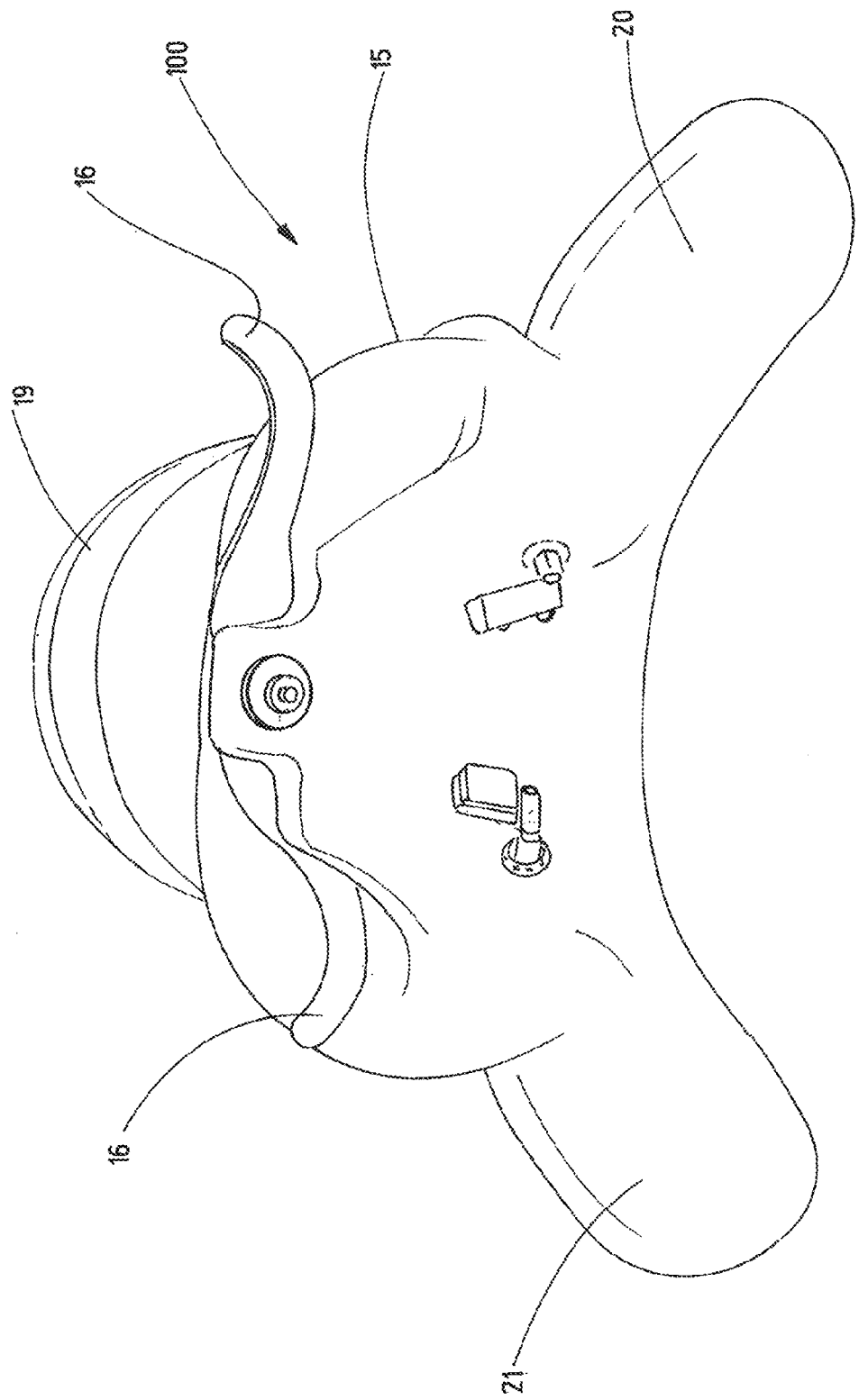
FIGS. 4 and 5 are another control device with an ergonomically shaped first control element.
Figure 5:
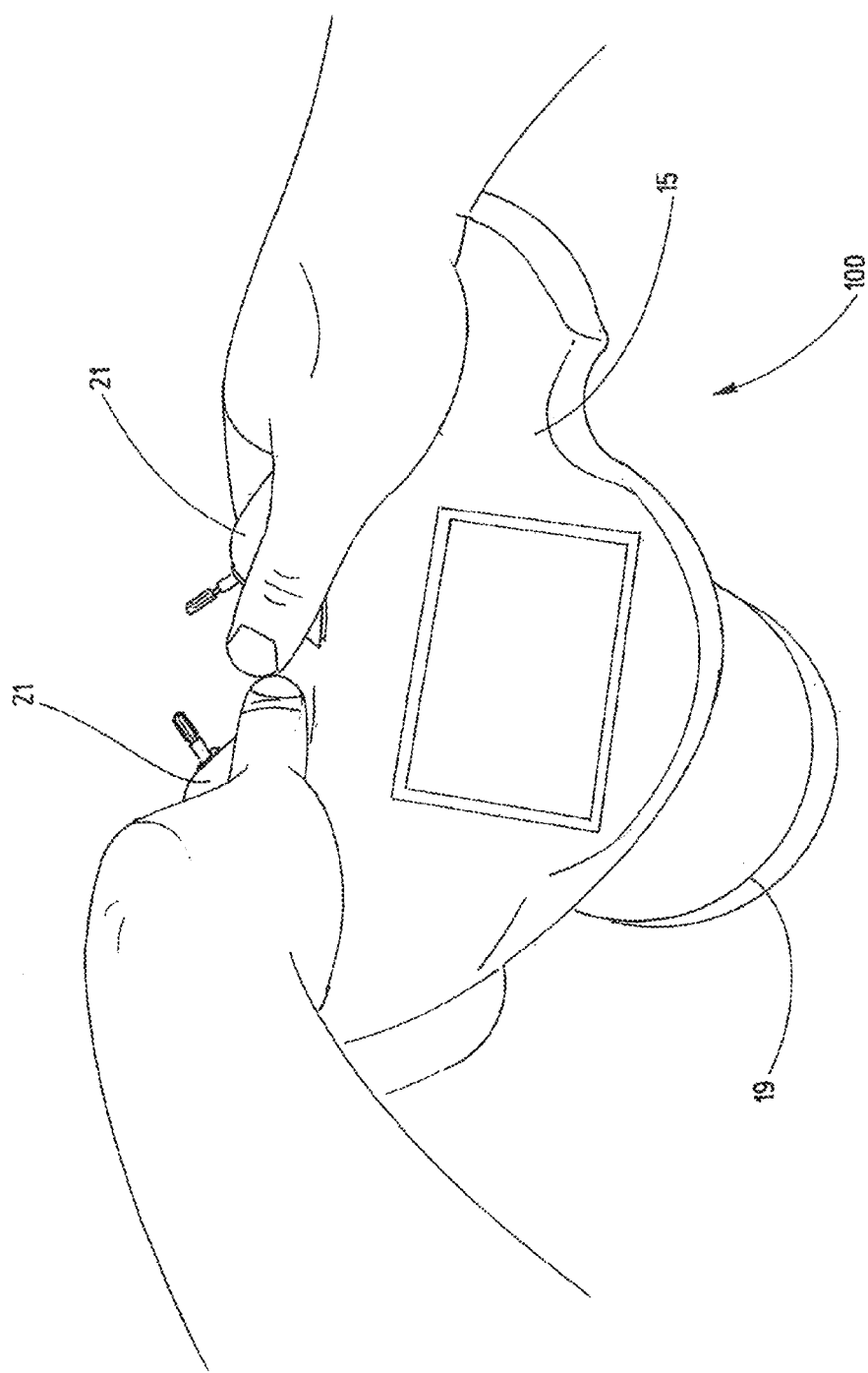

FIGS. 4 and 5 show a further variant of a control device 100. In contrast to the examples in FIGS. 1 to 3, the variant shown here has a more ergonomic shape. The first control element 15 is integrally designed with the handles 20, 21 and is mounted on a stationary base 19 so as to be rotatable about the vertical axis 11a of the first control element 15 and pivotable about the longitudinal axis 12a and the transverse axis 13a of the first control element 15. In the example shown in FIGS. 4 and 5, the stationary base 19 is relatively small compared to the upper region of the first control element 15 and has a round cross section. The stationary base 19 could, however, have any suitable shape and size.

In the example shown in FIGS. 4 and 5, the first control element 15 is directly arranged or supported on the stationary base 19 via the corresponding bearings. Similar to the examples shown in FIGS. 1 and 3, the second control element 16 is arranged on the first control element 15 in the form of one or two levers.

The example of a control device 100 shown in FIGS. 4 and 5 has a particularly ergonomic shape due to the integral design of the first control element 15 with the handles 20, 21 and thus offers a comfortable holding, gripping and operation of the control device.

Figure 6A:
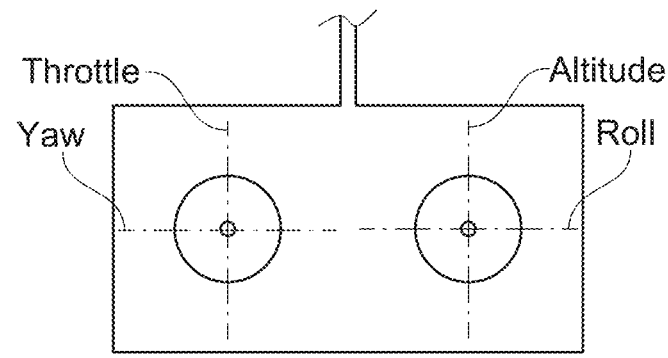
FIG. 6a is a schematic representation of a 4-channel remote control from prior art.

FIG. 6a shows a schematic illustration of a four-channel remote control known from prior art. Such a four-channel remote control has two control levers via which two channels of the airborne object 10 can be controlled (not shown in FIG. 6a for the sake of clarity). Typically, the right control lever controls the deflection of the airborne object 10 about its vertical axis 11 and its transverse axis 13. The left control lever controls the deflection of the airborne object 10 about its longitudinal axis 12 and also the throttle and thus the change in the flight altitude of the airborne object 10 (fourth channel). In such a remote control, the two control levers can be operated either with the two thumbs or with a combination of the thumb and the forefinger.

Figure 6B:
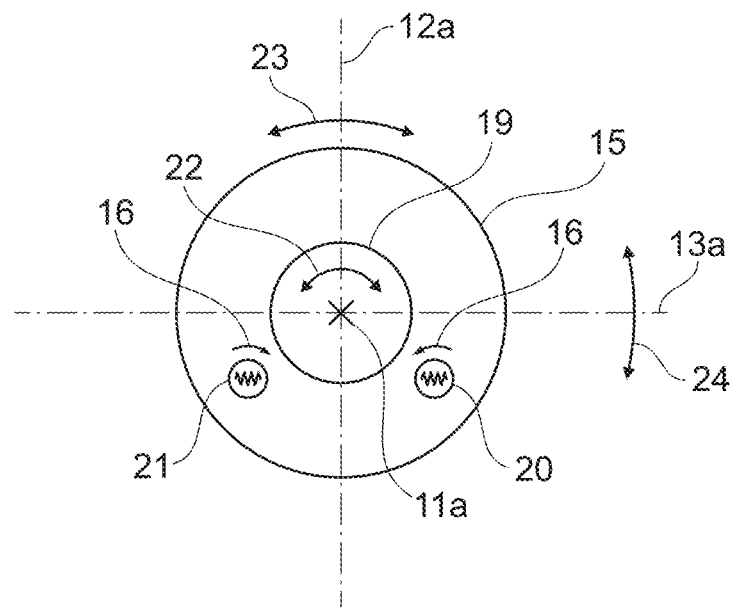
FIG. 6b is a schematic diagram of a control device.

FIG. 6b shows a schematic illustration of the control device 100 according to the invention. In contrast to the typical four-channel remote controls known from prior art (refer to FIG. 6a in this regard), three channels of the airborne object 10 (also not shown in FIG. 6b for the sake of clarity) are controlled via a first control element 15. For this purpose, the first control element 15 can be rotated about its vertical axis 11a, tilted or pivoted about its longitudinal axis 12a and tilted or pivoted about its transverse axis 13a. For this purpose, the first control element 15 is rotatably and pivotably mounted on a stationary base 19 in a corresponding manner.

In contrast to the four-channel remote control known from prior art, three channels are thus controlled by means of a single control element (the first control element 15). The fourth channel is controlled by means of a separate control element, namely the second control element 16. Thus, according to the present invention, a first control element 15 for controlling three channels and a second control element 16 for controlling a single channel, namely the fourth channel, are provided.

In order to grip of the first control element 15 in an easier and more convenient manner, corresponding handles 20, 21 are arranged thereon. Possible embodiments and variants are shown by way of example in FIGS. 1 to 5.

The first control element 15 can be rotated about its vertical axis 11a by a first maximum angle 22. The first maximum angle 22 is adjustable or variable. The first translation factor is used to convert the rotary movement of the first control element 15 about its vertical axis 11a into the actual control of the airborne object 10.

Corresponding to the vertical axis 11a of the first control element 15, the first control element 15 can be pivoted about its longitudinal axis 12a by a second maximum angle 23. Furthermore, the first control element 15 can correspondingly be pivoted about its transverse axis 13a by a third maximum angle 24. Just as the first maximum angle 22, the second maximum angle 23 and the third maximum angle 24 can be varied or adjusted. The second and third translation factors are used in this regard to implement the actual control of the airborne object 10.

Figure 6C:
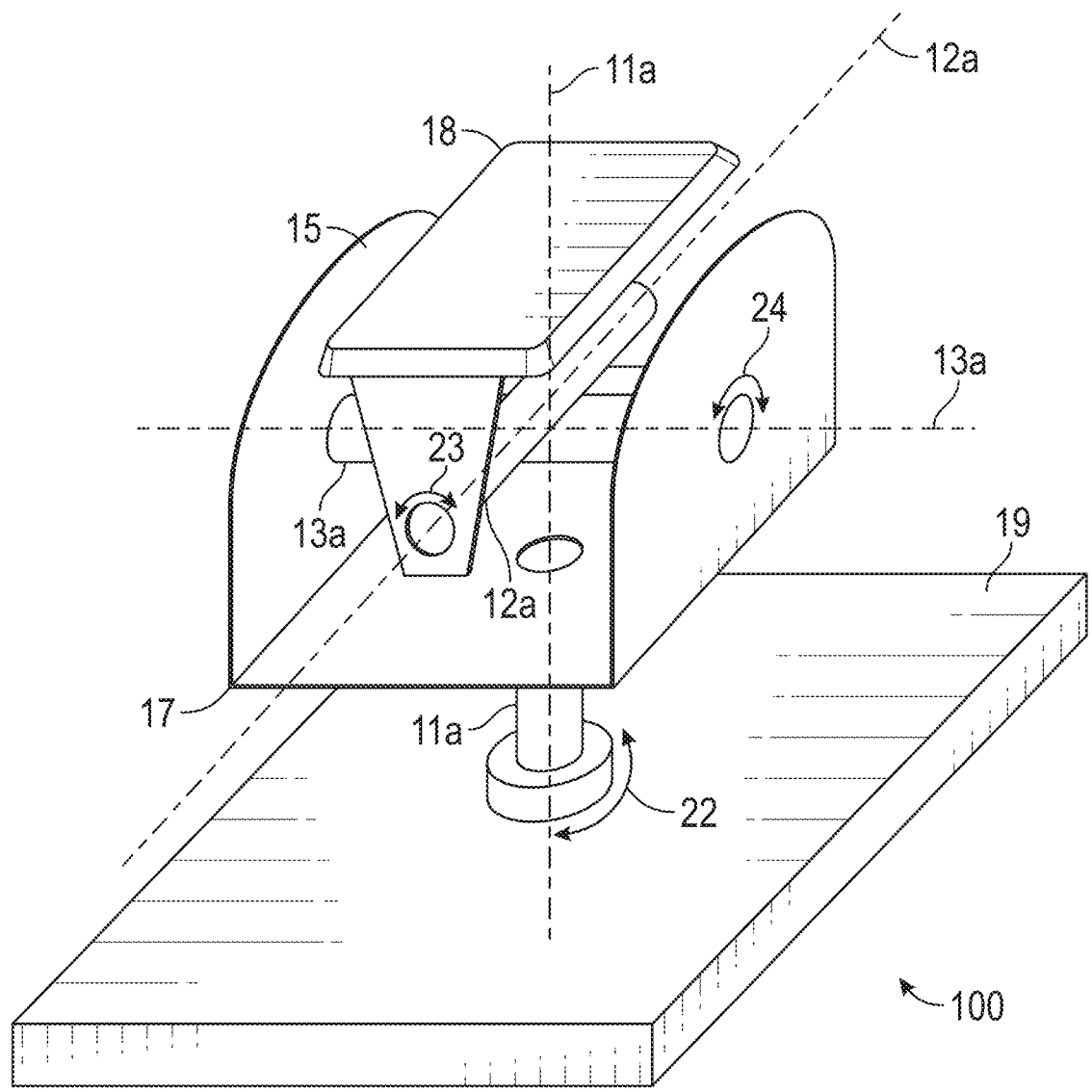
FIG. 6c is a 3-dimensional schematic representation of a control device.
Figure 7A:
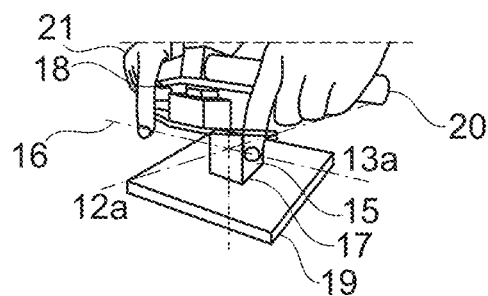
FIGS. 7a-7d are exemplary rotating and pivoting movements of the first control element of the control device.
Figure 7A:
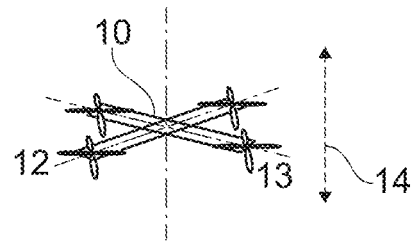
Figure 7B:
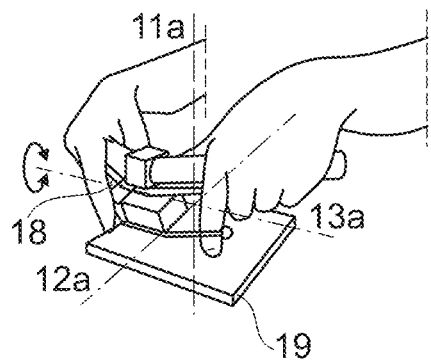
Figure 7B:
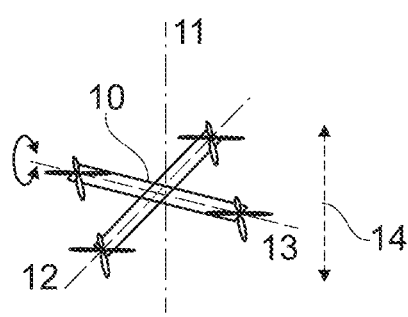
Figure 7C:
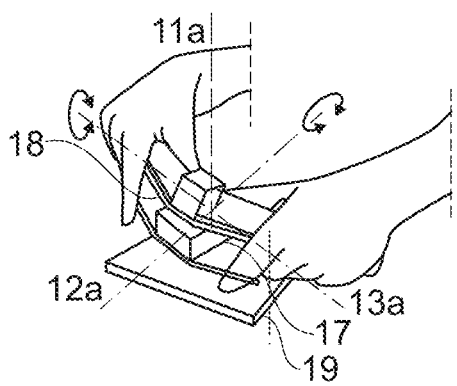
Figure 7C:
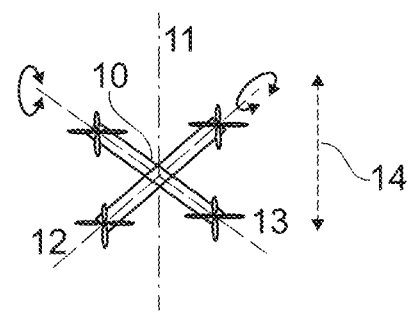
Figure 7D:
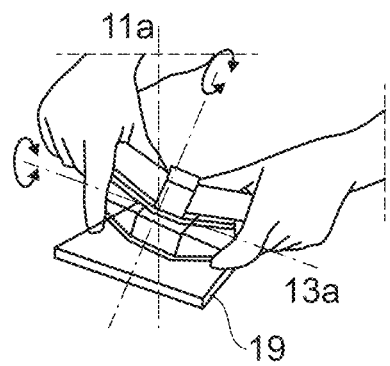
Figure 7D:
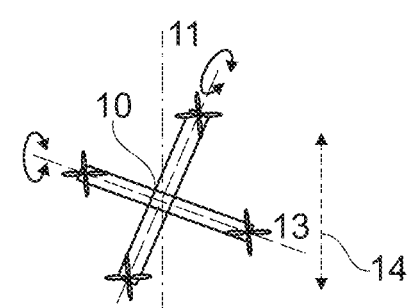

FIG. 6c shows a 3-dimensional view of a schematic illustration of the control device 100. The first control element 15 is mounted on the stationary base 19 in such a way that it can rotate about its vertical axis 11a. Furthermore, the first control element 15 is arranged to be pivotable about its longitudinal axis 12a and its transverse axis 13a. For this purpose, in this example, all three axes 11a, 12a, 13a run through a common point of intersection. In principle, however, the longitudinal axis 12a and the transverse axis 13a could also be arranged one above the other at a small distance.

As shown in FIG. 6c, the rotatable bearing of the vertical axis 11a of the first control element 15 can be arranged along this vertical axis 11a at a distance from the longitudinal axis 12a and transverse axis 13a of the first control element 15.

The invention claimed is:

1. A control device for controlling an airborne object, comprising:
    a first control element configured to control movement of the airborne object about a vertical axis, a longitudinal axis and a transverse axis of the airborne object; and
    a second control element configured to control a change in one of a flight altitude, a speed, and a thrust of the airborne object,
    wherein the first control element is rotatable and/or pivotable about a vertical axis, a longitudinal axis and a transverse axis of the first control element to cause the movement of the airborne object about the vertical axis, the longitudinal axis and the transverse axis of the airborne object,
    wherein the vertical axis, longitudinal axis, and the transverse axis of the first control element run through a common point,
    wherein the control device includes two handles rigidly connected to the first control element, and
    wherein the two handles are arranged on a line parallel to the transverse axis of the first control element.

2. The control device according to claim 1,
    wherein the first control element includes two parallel and spaced-apart planes that are rotatable or pivotable together about the respective axes of the first control element.

3. The control device according to claim 1, characterized in that:
    wherein the second control element is a rocker.

4. The control device according to claim 1,
    wherein the second control element is arranged on the first control element; and
    wherein the second control element is arranged on a stationary base of the control device.

5. The control device according to claim 1,
    wherein the first control element is rotatable about the vertical axis of the first control element by a first maximum angle, wherein the first maximum angle is adjustable.

6. The control device according to claim 1,
    wherein the first control element is rotatable about the longitudinal axis of the first control element by a second maximum angle, wherein the second maximum angle is adjustable.

7. The control device according to claim 1,
    wherein the first control element is rotatable about the transverse axis of the first control element by a third maximum angle, wherein the third maximum angle is adjustable.

* * * * *